United States Patent
Sergeev

(10) Patent No.: US 12,105,227 B2
(45) Date of Patent: Oct. 1, 2024

(54) METHOD FOR DETERMINING A ROLL ANGLE OF AN OPTOELECTRONIC SENSOR BY MEANS OF SCAN POINTS OF A SENSOR IMAGE, AND OPTOELECTRONIC SENSOR

(71) Applicant: Valeo Schalter und Sensoren GmbH, Bietigheim-Bissingen (DE)

(72) Inventor: Nikolai Sergeev, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 949 days.

(21) Appl. No.: 17/052,675

(22) PCT Filed: Apr. 25, 2019

(86) PCT No.: PCT/EP2019/060562
§ 371 (c)(1),
(2) Date: Nov. 3, 2020

(87) PCT Pub. No.: WO2019/211149
PCT Pub. Date: Nov. 7, 2019

(65) Prior Publication Data
US 2021/0181324 A1 Jun. 17, 2021

(30) Foreign Application Priority Data
May 4, 2018 (DE) .................... 10 2018 110 774.9

(51) Int. Cl.
*G01S 7/497* (2006.01)
*G01S 17/89* (2020.01)
*G06V 20/58* (2022.01)

(52) U.S. Cl.
CPC ............ *G01S 7/4972* (2013.01); *G01S 17/89* (2013.01); *G06V 20/58* (2022.01); *G06V 20/582* (2022.01)

(58) Field of Classification Search
CPC ...... G01S 7/4972; G01S 17/931; G01S 17/89; G01S 17/42; G01S 7/4813; G01S 17/86;
(Continued)

(56) References Cited

U.S. PATENT DOCUMENTS 6,810,330 B2 * 10/2004 Matsuura ............. G01S 7/4802
701/301
9,052,721 B1 * 6/2015 Dowdall ................ B64D 45/00
(Continued)

FOREIGN PATENT DOCUMENTS

CN 103257061 A * 8/2013 ........... G01N 1/2813
DE 102008016188 A1 * 10/2009 ............ G01S 17/42
(Continued)

OTHER PUBLICATIONS

International Search Report and Written Opinion in corresponding International Application No. PCT/EP2019/060562, mailed Aug. 12, 2019 (11 pages).
(Continued)

*Primary Examiner* — Michael P Stafira
(74) *Attorney, Agent, or Firm* — Osha Bergman Watanabe & Burton LLP

(57) ABSTRACT

A method for determining a roll angle (α) of an optoelectronic sensor of a motor vehicle, wherein the optoelectronic sensor comprises at least one transmitter device, at least one receiver unit and at least one evaluation unit is disclosed. The method involves emitting light beams into surroundings of the vehicle by the transmitter device, receiving light beams reflected at an object by the receiver unit, wherein the received light beams are represented by the evaluation unit
(Continued)

as scan points in a sensor image of the surroundings of the motor vehicle, wherein the roll angle (α) is determined by the evaluation unit between at least one scan axis and at least one reference axis, wherein the scan axis is formed by at least one scan point of a ground structure and a reference point of the reference axis of the optoelectronic sensor.

10 Claims, 3 Drawing Sheets

(58) Field of Classification Search
CPC ...... G01S 7/4808; G01S 19/14; G01S 7/4817; G01S 7/4802; G01S 7/497; G01S 17/10; G01S 17/08; G01S 17/894; G01S 19/49; G06V 20/58; G06V 10/454; G06V 10/764; G06V 20/56; G06V 20/582; G06V 20/584; G06V 10/758; G06V 10/243; G06V 10/44; G06V 20/64
See application file for complete search history.

(56) References Cited

U.S. PATENT DOCUMENTS

2004/0247157 A1* 12/2004 Lages .................... G01S 17/89
382/104

2014/0038849 A1* 2/2014 Mirkin .................. G03F 7/0002
506/10
2014/0186881 A1* 7/2014 Walsh ...................... C12Q 1/04
435/38
2014/0332382 A1* 11/2014 Herr ................. G01N 27/44795
204/601

FOREIGN PATENT DOCUMENTS

| DE | 102008026876 | A1 | | 12/2009 | |
|---|---|---|---|---|---|
| DE | 102012024983 | A1 | * | 7/2013 | .......... B60W 40/072 |
| DE | 102015118085 | A1 | * | 4/2017 | |
| EP | 1557691 | A1 | | 7/2005 | |
| EP | 2105761 | A2 | | 9/2009 | |
| FR | 3036180 | A1 | * | 11/2016 | ................ B60T 7/22 |
| JP | 2003-057345 | A | | 2/2003 | |
| JP | 2010-271083 | A | | 12/2010 | |
| WO | WO-0059624 | A1 | * | 10/2000 | .......... B01F 17/0028 |

OTHER PUBLICATIONS

German Search Report in corresponding German Application No. 10 2018 110 774.9, dated Dec. 23, 2019 (9 pages).
Notice of Preliminary Rejection issued in corresponding Korean Patent Application No. 2020-7031778, dated Oct. 21, 2021 (15 pages).

* cited by examiner

METHOD FOR DETERMINING A ROLL ANGLE OF AN OPTOELECTRONIC SENSOR BY MEANS OF SCAN POINTS OF A SENSOR IMAGE, AND OPTOELECTRONIC SENSOR

The invention relates to a method for determining at least one roll angle of an optoelectronic sensor of a motor vehicle. The optoelectronic sensor comprises a transmitter device, a receiver unit with at least two receiver elements, and an evaluation unit. The transmitter device is used to emit light beams into surroundings of the motor vehicle. The light beams reflected at an object are received by means of the receiver unit and represented as scan points in a sensor image generated by the optoelectronic sensor by means of the evaluation unit. Further, the invention relates to an optoelectronic sensor.

The prior art has already disclosed methods for detecting misalignments of lidar sensors. By way of example U.S. Pat. No. 9,052,721 B1 discloses such a method. To this end, the lidar sensor supplies a 3D point cloud, which comprises scan points reflected on the ground and on at least one motor vehicle. The 3D point cloud is compared to a 3D reference point cloud and a misalignment of the lidar sensor is calculated.

It is an object of the present invention to develop a method and an optoelectronic sensor, by means of which a roll angle of the optoelectronic sensor can be determined in improved fashion.

This object is achieved by way of a method and an optoelectronic sensor in accordance with the independent claims.

One aspect of the invention relates to a method for determining a roll angle of an optoelectronic sensor of a motor vehicle. The optoelectronic sensor comprises at least one transmitter device, at least one receiver unit and an evaluation unit. The method includes the following steps:
  emitting light beams into surroundings of the motor vehicle by the transmitter device,
  receiving light beams reflected at an object by means of the receiver unit, wherein the received light beams are represented by the evaluation unit as scan points in a sensor image of the surroundings of the motor vehicle generated by the optoelectronic sensor.

The objects can be, for example, further vehicles, traffic signs or persons. Additionally, reflections from the roadway surface or from the surface on which the vehicle is situated can be received. The roll angle is determined by the evaluation unit between at least one scan axis and at least one reference axis. Here, the scan axis is formed by at least one scan point of a ground structure and a reference point of a reference axis of the optoelectronic sensor.

Expressed differently, a scan point of a ground structure is taken as an initial point for determining the roll angle. Using the scan point and a reference point provided by a reference axis, a scan axis is determined, for example in the form of a straight line that is placed through the scan point and the reference point. The roll angle is determined as the angle between the scan axis and the reference axis. Alternatively, a scan plane and a reference plane can also be spanned in order to determine the roll angle. Here, a scan plane can be spanned using the scan point, the reference point and a known position of the optoelectronic sensor. Here, the angle between the scan plane and the reference plane once again corresponds to the roll angle. However, the two-dimensional representation by means of scan and reference axis is easier in application. In particular, the roll angle is a rotation of the optoelectronic sensor about a vehicle longitudinal axis of the motor vehicle.

In one embodiment, the reference axis is determined on the basis of a pitch angle and a yaw angle of the optoelectronic sensor. Advantageously, the yaw angle, which describes a rotation of the optoelectronic sensor about a vehicle vertical axis, and the pitch angle, which describes a rotation of the optoelectronic sensor about a vehicle transverse axis, are already determined before the roll angle is determined. The optoelectronic sensor comprises an evaluation unit, by means of which the optoelectronic sensor was advantageously already calibrated or corrected for the pitch angle and the yaw angle such that an improved determination of the roll angle can be carried out.

By way of example, the pitch angle and the yaw angle can be determined in such a way that a sensor coordinate system is determined by means of at least two scan points of a first receiver element of the receiver unit. Additionally, a reference coordinate system can be determined by at least one scan point of the first receiver element with at least one scan point of a second receiver element, wherein the scan point of the second receiver element is specified on the basis of a selection of the scan point of the first receiver element. In particular, provision can be made for the scan points of the first and the second receiver element, which are used for generating the reference coordinate system, to have the same horizontal angle. The horizontal angle is an angle within a plane spanned by a vehicle longitudinal axis and a vehicle transverse axis.

The sensor coordinate system can be compared to the reference coordinate system and, depending on the comparison, the pitch angle and/or the yaw angle of the optoelectronic sensor can be determined.

In particular, the optoelectronic sensor can be embodied as a lidar sensor or laser scanner.

According to an advantageous development, the scan point and the reference point are determined in such a way that these have at least a predetermined lateral distance from one another. Provision can be made for a distance threshold to be determined and for the roll angle only to be determined accordingly if the distance threshold is exceeded by the lateral distance. By way of example, this distance threshold can correspond to at least half a vehicle width.

In a further embodiment, the reference point is based on an installation height of the optoelectronic sensor on the motor vehicle. Expressed differently, the reference point is specified by a known installation position in the vehicle. If the installation height or installation position is known, it is possible, for example, to estimate the vertical distance of the sensor from a roadway or from a surface below the motor vehicle. The roadway or the surface can be used as a basis for determining the reference axis or for the reference plane. Alternatively, the installation height or the installation position can be used as a reference position. This allows the roll angle to be determined between the reference point as installation height of the optoelectronic sensor and the received scan point. As a result, it is not necessary to receive two scan points, in particular, in order to be able to determine the roll angle. As a result, it is possible to determine the roll angle easily but nevertheless reliably in many driving situations. In particular, in the case of a known installation height or installation position, the roll angle can be determined on the basis of a single ground structure. This is advantageous, in particular, when only one ground structure is captured in the sensor image since a second ground structure may be lacking or may be covered.

Likewise, provision is made for the scan point to have a first spatial coordinate, a second spatial coordinate and a third spatial coordinate and for the roll angle to be determined by an arctangent function of the ratio of the second spatial coordinate to the third spatial coordinate. In particular, the first spatial coordinate is along the vehicle longitudinal direction (X_A), the second spatial coordinate is along the vehicle transverse direction (Y_A) and the third spatial coordinate is along the vehicle vertical direction (Z_A):

$$A(X\_A, Y\_A, Z\_A);$$

$$\alpha = a\tan((Z\_A)/Y\_A));$$

where A corresponds to the scan point and a corresponds to the roll angle. Should a plurality of scan points be received in a line and, as a result, a plurality of respective roll angles be determined, the roll angle can be determined by forming the mean value of the respective roll angles.

According to a further advantageous configuration, the reference point is based on a second scan point received. In particular, the second scan point received can originate from a second line on the roadway. In particular, the two scan points received have a sufficiently large lateral distance from one another such that, advantageously, the roll angle can be determined. In particular, the scan axis is then placed between the first scan point and the second scan point. An angle corresponding to the roll angle can be determined between the reference axis, which extends through the second scan point, and the scan axis. As a result, it is possible, in particular, to reliably determine the roll angle independently of an installation height of the optoelectronic sensor. By way of example, the installation height can vary on account of the suspension of the motor vehicle and/or on account of abrasion of the tyre surface and/or on account of a load of the motor vehicle.

Further, provision is made for the scan point to have a first spatial coordinate (X_A), a second spatial coordinate (Y_A) and a third spatial coordinate (Z_A) and for the second scan point to have a further first spatial coordinate (X_B), a further second spatial coordinate (Y_B) and a further third spatial coordinate (Z_B) and for the roll angle to be determined by an arctangent function of the ratio of the difference between the further third spatial coordinate and the third spatial coordinate and the difference between the further second spatial coordinate and the second spatial coordinate. In particular, the first and further first spatial coordinate is along the vehicle longitudinal direction (X-coordinate), the second and further second spatial coordinate is along the vehicle transverse direction (Y-coordinate) and the third and further third spatial coordinate is along the vehicle vertical direction (Z-coordinate): Formula:

$$A(X\_A, Y\_A, Z\_A);$$

$$B(X\_B, Y\_B, Z\_B);$$

$$\alpha = a\tan((Z\_B - Z\_A)/(Y\_B - Y\_A);$$

where A corresponds to the first scan point and B corresponds to the second scan point and a corresponds to the roll angle. In particular, this allows the roll angle to be determined reliably and independently of an installation height of the optoelectronic sensor which, in particular, may vary, for example on account of the suspension of the motor vehicle and/or an account of abrasion of the tyre surface and/or on account of a load of the motor vehicle.

According to a further configuration, the optoelectronic sensor is calibrated on the basis of the roll angle. Using the evaluation unit of the optoelectronic sensor, it is possible to determine the roll angle and, on the basis of the roll angle, it is then possible to calibrate the optoelectronic sensor. In particular, the misalignment of the optoelectronic sensor can be corrected by determining the roll angle by means of the evaluation unit such that, when the optoelectronic sensor is used, it is possible to provide a corrected sensor image for the evaluation for further assistance systems. In particular, it is consequently possible to provide an improved optoelectronic sensor in the case of semi-autonomous, in particular autonomous, driving operation of the motor vehicle, it being able to use said optoelectronic sensor reliably and safely in road traffic.

In a preferred embodiment, the roll angle is determined during an operation, in particular a driving operation, of the motor vehicle. In particular, this allows the current roll angle of the optoelectronic sensor to be determined whilst driving and the optoelectronic sensor can be appropriately calibrated and corrected in any driving situation. By way of example, a driving situation here can be driving on a motorway, a parking procedure or else a standstill, for example at traffic lights or at a crossing. In particular, the respective misalignment may vary in the case of different load states of the motor vehicle, for example. By determining the roll angle in up-to-date fashion, it is possible to calibrate the optoelectronic sensor even in the case of different load states. As a result, the optoelectronic sensor can be operated better in a plurality of driving situation, and so the safety in road traffic can be improved for a multiplicity of different driving situations. In particular during an at least semi-autonomous operation of the motor vehicle, in particular during an autonomous operation thereof, this allows an improved recognition of a roadway guidance and/or of objects in the surroundings of the motor vehicle to be realized, as a result of which there can be increased safety in road traffic.

In a further embodiment, at least one scan point of a road marking recognized in the sensor image is used to determine the roll angle. What can be exploited here is that road markings are applied to many roadways. Moreover, road markings in many countries may have strongly reflecting particles. Consequently, these road markings can be easily recognized. Additionally, road markings can have a sufficiently large lateral distance from one another and, moreover, can be aligned parallel to one another. Hence the roll angle can be reliably determined using road markings recognized in the sensor image.

Further, a road safety barrier and/or a wall, in particular a tunnel wall, can be used for the method. In particular, this allows the method to be able to be carried out very reliably even where there are no road markings. Since in particular road safety barriers and/or walls, in particular tunnel walls, are likewise aligned parallel to one another, these can also be used reliably for the method. In particular, this also allows curves to be taken into account in the method.

Consequently, road markings, road safety barriers and/or walls, in particular tunnel walls, can be ground structures within the meaning of the invention.

According to a further advantageous configuration, a respective roll angle is determined for a plurality of scan points and the roll angle of the optoelectronic sensor is determined as a statistical mean of the respective determined roll angles of the scan points. In particular, this allows the determined roll angle of a respective scan point to be verified by further determinations of roll angles and inaccuracies, in particular, can be compensated for by determining the roll angle by way of the statistical mean. As a result, the roll angle of the optoelectronic sensor can be reliably determined.

A further aspect of the invention relates to an optoelectronic sensor comprising at least one transmitter device for emitting light beams and comprising at least one receiver unit. The receiver unit is embodied to receive light beams reflected at an object. The optoelectronic sensor comprises an evaluation unit which is embodied to represent the received light beams as scan points in a sensor image of the surroundings of the motor vehicle. Further, the evaluation unit is designed to determine a roll angle between at least one scan axis and at least the reference axis. The scan axis is formed by at least one received scan point of a ground structure and a reference point of a reference axis of the optoelectronic sensor.

Advantageous configurations of the method should be considered to be advantageous configurations of the optoelectronic sensor. To this end, the optoelectronic sensor has physical features which allow the method or an advantageous configuration thereof to be carried out.

Further features of the invention emerge from the claims, the figures and the description of the figures. The features and combinations of features that are cited in the description above, and also the features and combinations of features that are cited in the description of the figures below and/or as shown in the figures alone, can be used not only in the respectively indicated combination but also in other combinations or on their own without departing from the scope of the invention. Embodiments of the invention that are not explicitly shown and explained in the figures, but emanate and are producible from the explained embodiments by virtue of self-contained combinations of features, are therefore also intended to be regarded as included and as disclosed. Embodiments and combinations of features which therefore do not have all the features of an originally formulated independent claim are also considered to be disclosed. Embodiments and combinations of features that go beyond or differ from the combinations of features set out in the back-references of the claims should furthermore be considered to be disclosed, in particular by the embodiments set out above.

The invention will now be explained in more detail on the basis of preferred exemplary embodiments and with reference to the attached drawings.

The same reference signs are given in the figures to identify elements that are identical and have the same functions.

Figure 1:
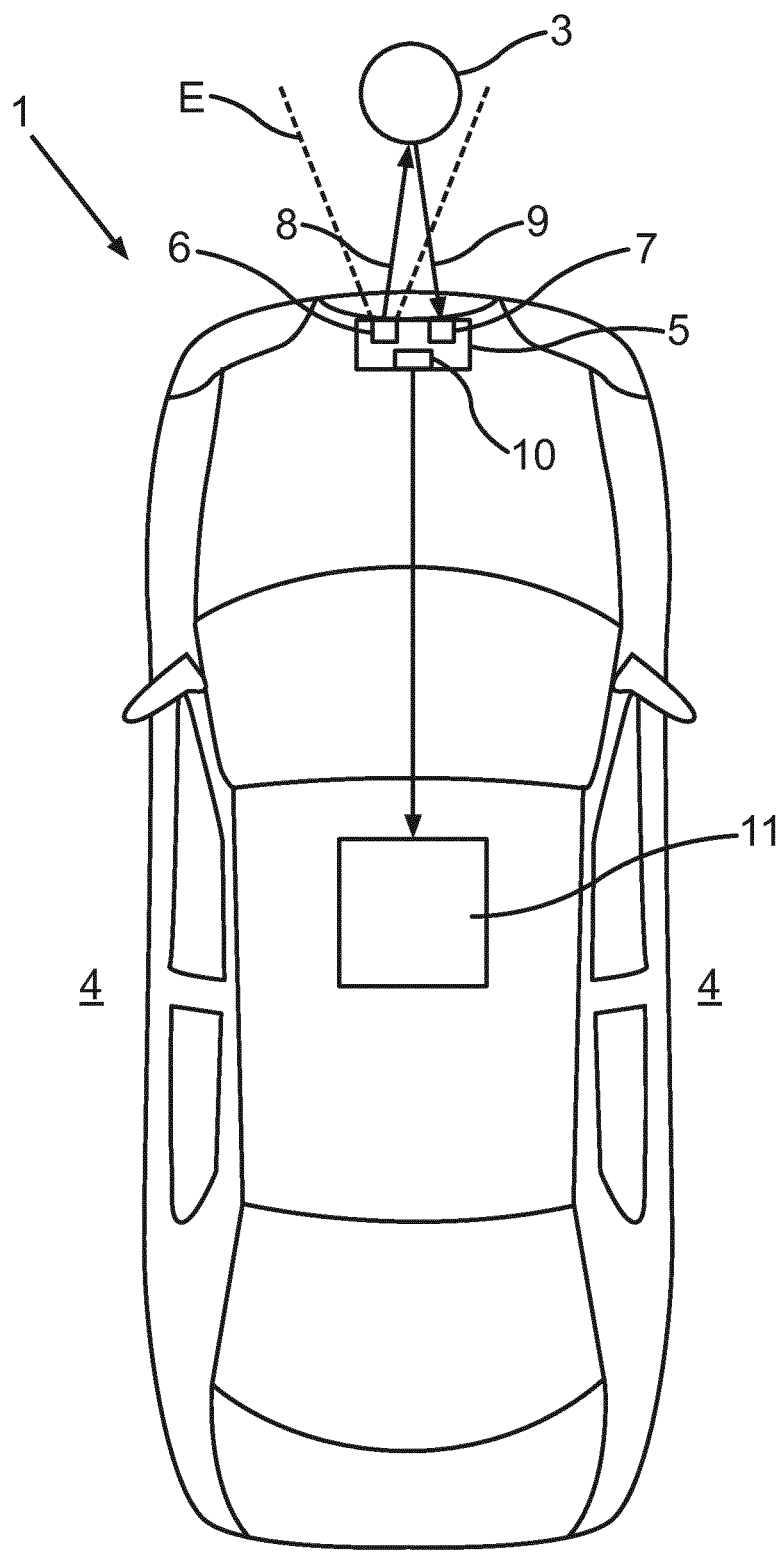
FIG. 1 shows a schematic plan view of a motor vehicle comprising an embodiment of an optoelectronic sensor.

FIG. 1 shows a motor vehicle 1 comprising a driver assistance system 2. An object 3 that is located in surroundings 4 of the motor vehicle 1, for example, can be captured by the driver assistance system 2. In particular, a distance between the motor vehicle 1 and the object 3 can be determined by means of the driver assistance system 2.

The driver assistance system 2 comprises at least one optoelectronic sensor 5. The optoelectronic sensor 5 can be embodied as a lidar sensor or laser scanner. The optoelectronic sensor 5 comprises a transmitter device 6, by means of which light beams 8 can be emitted or sent out. In the present case, the optoelectronic sensor 5 is arranged at a front region of the motor vehicle 1. The optoelectronic sensor 5 can also be arranged in other regions, for example at a rear region or at a side region of the motor vehicle 1. The present example is thus not to be considered to be exhaustive, but only serves to illustrate an essential concept.

The light beams 8 can be emitted by the transmitter device 6 within a predetermined capture range E or a predetermined angular range. By way of example, the light beams 8 can be emitted in a predetermined horizontal angular range. Moreover, the optoelectronic sensor 5 comprises a deflection device (not shown), by means of which the light beams 8 can be deflected into the surroundings 4 and hence the capture region E is scanned.

Moreover, the optoelectronic sensor 5 comprises a receiver unit 7, which may comprise a photodiode, for example. Using the receiver unit 7, the light beams 9 reflected by the object 3 can be received as a reception signal. Further, the optoelectronic sensor 5 can comprise a control device, which may be formed by a microcontroller or a digital signal processor, for example. The optoelectronic sensor 5 can comprise an evaluation unit 10, by means of which the reflected light beams 9 can be evaluated as scan points 15, 16, 20, 21 (see FIG. 3 and FIG. 4). The driver assistance system 2 further comprises a control device 11 that can be formed, for example, by an electronic control unit (ECU) of the motor vehicle 1. The control device 11 is connected to the optoelectronic sensor 5 for data transfer. The data transfer can be implemented, for example, via the data bus of the motor vehicle 1.

Figure 2:
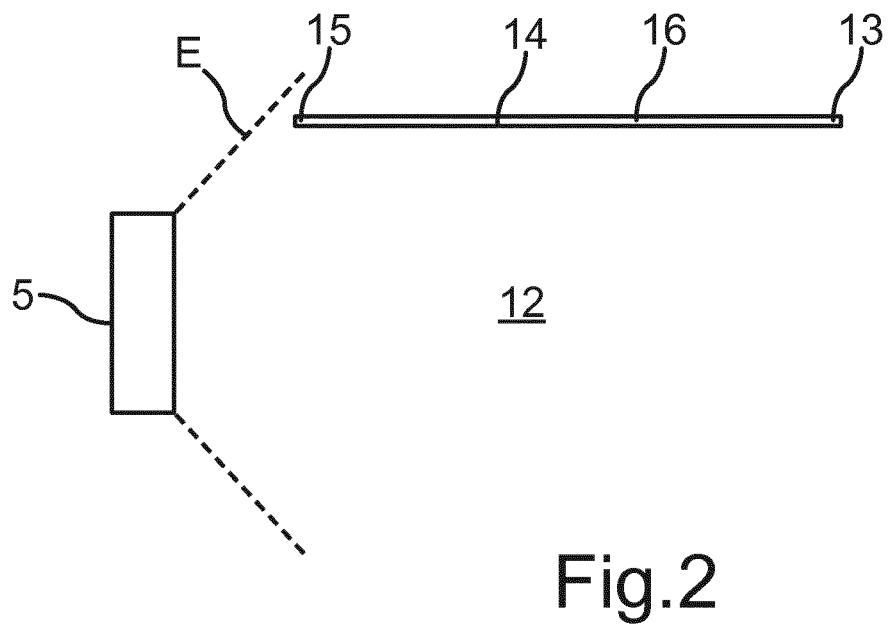
FIG. 2 shows a schematic plan view of a first reception situation by the embodiment of the optoelectronic sensor.

FIG. 2 shows a schematic plan view of a first reception situation. The optoelectronic sensor 5 is directed on a roadway 12 with its reception region E. For a simplified overview, the motor vehicle 1 has not been illustrated; instead, all that is shown is the optoelectronic sensor 5, which is arranged on the motor vehicle 1. A ground structure 13 is situated on the roadway 12; said ground structure, in particular, having a line-shaped embodiment and being embodied as a first road marking 14 in the present case. The first road marking 14 has at least one first scan point 15. Further, it is possible that further light beams 8 reflected by the road marking 14 can be received by the optoelectronic sensor 5 and can each be represented as a scan point 16 in the sensor image.

Figure 3:
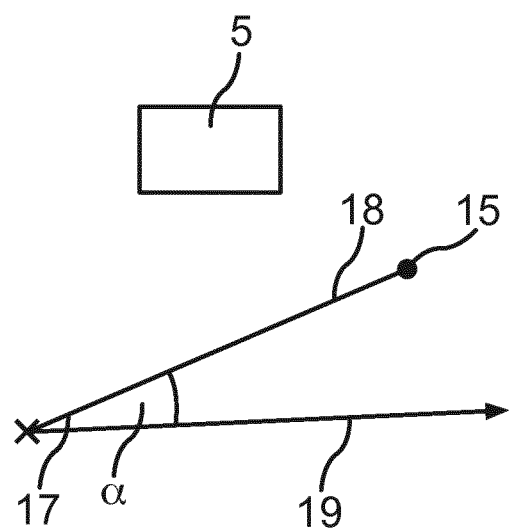
FIG. 3 shows a schematic transverse view of the embodiment of the optoelectronic sensor of FIG. 2.

FIG. 3 shows a schematic transverse view of the first reception situation of FIG. 2. FIG. 3 shows a vehicle transverse axis Y and a vehicle vertical axis Z. In the method according to the invention, a roll angle $\alpha$ is determined, which, in particular, can be found between the vehicle transverse axis Y and the vehicle vertical axis Z. In particular, the roll angle $\alpha$ is a rotation about a vehicle longitudinal axis X, which is indicated at the origin in the present case. Further, FIG. 3 shows the scan point 15 and a reference point 17, which is likewise arranged at the origin in the present case. A scan axis 18 is placed between the reference point 17 and the scan point 15. A reference axis 19 likewise depends on the reference point 17, a pitch angle and a yaw angle of the optoelectronic sensor 5. In particular, the reference axis 19 can be corrected for the yaw angle and the pitch angle of the optoelectronic sensor 5. In particular, the roll angle $\alpha$ is the angle between the scan axis 18 and the reference axis 19.

In particular, the scan point 15 and the reference point 17 are determined in such a way that these have at least a predetermined lateral distance from one another. In particular, the reference point 17 can be based on an installation height of the optoelectronic sensor 5 on the motor vehicle 1.

In particular, the scan point 15 has a first spatial coordinate X_A in the X-direction, a second spatial coordinate Y_A in the Y-direction and a third spatial coordinate Z_A in the Z-direction. The roll angle α is determined by an arctangent function of the ratio of the second spatial coordinate Y_A to the third spatial coordinate Z_A:

$$A(X\_A, Y\_A, Z\_A);$$

$$\alpha = a\tan((Z\_A)/Y\_A));$$

Figure 4:
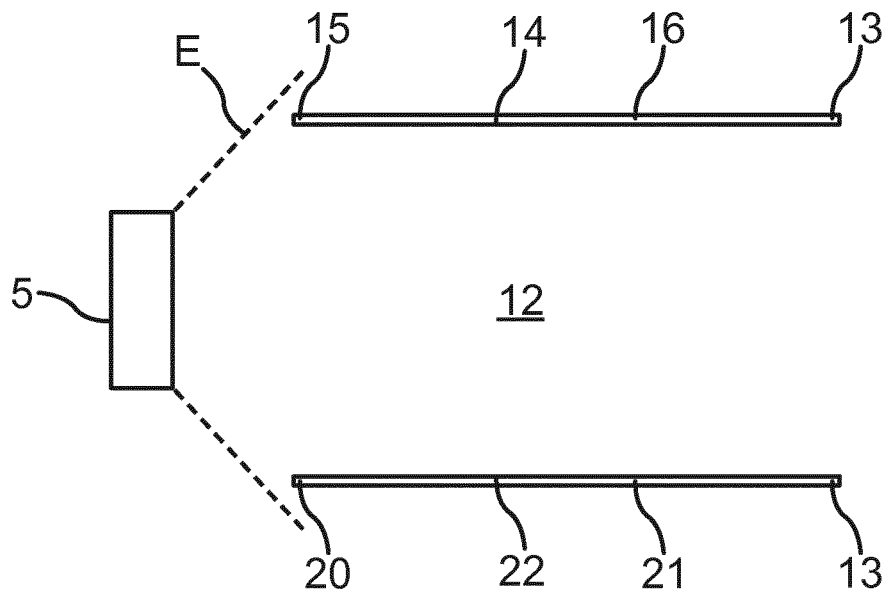
FIG. 4 shows a further schematic plan view of a second reception situation by the embodiment of the optoelectronic sensor.

FIG. 4 shows a schematic plan view of a second reception situation. For a simplified overview, the motor vehicle 1 has not been illustrated; instead, all that is shown is the optoelectronic sensor 5, which is arranged on the motor vehicle 1. In the present example, the roadway 12 has a ground structure 13, which is embodied as two road markings 14, 22 in this example. The first road marking 14 has at least one first scan point 15. The second road marking 22 has at least in the sensor image. In particular, as intended in the present case, both the first road marking 14 and the second road marking 22 can have a plurality of scan points 15, 20 and a respective roll angle α can be determined between the scan points 15, 16 of the first road marking 14 and the scan points 20, 21 of the second road marking 22 and the roll angle α of the optoelectronic sensor 5 can be determined as statistical mean of the respective determined roll angles α of the scan points 15, 16, 20, 21.

In particular, provision is made for the reference point 17 to be based on the second received scan point 20. As a result, it is possible, in particular, that the roll angle α can be determined independently of the installation height of the optoelectronic sensor 5, which can vary, in particular, on account of wear on the tyre and/or on account of different load states of the motor vehicle 1.

Figure 5:
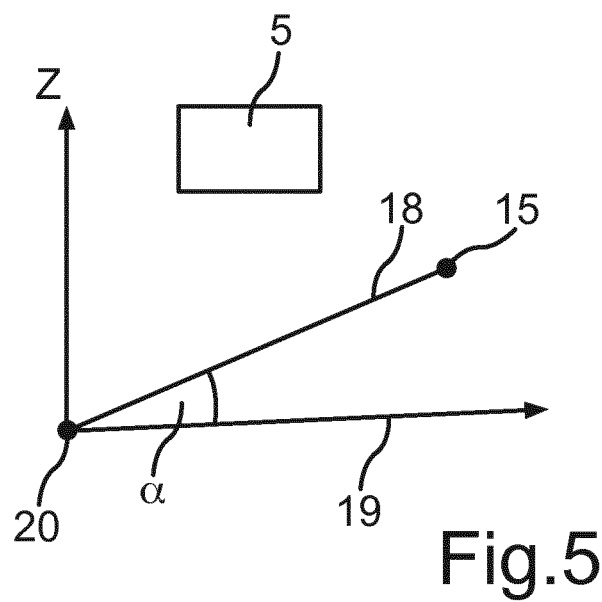
FIG. 5 shows a schematic transverse view of the embodiment of the optoelectronic sensor of FIG. 4.

FIG. 5 shows a schematic transverse view of the second reception situation of FIG. 4. In the following example, the roll angle α is determined between the scan point 15 and the second scan point 20. The scan axis 18 is placed between the scan point 15 and the second scan point 20. The reference axis 19 is determined on the basis of the second scan point 20, the pitch angle and the yaw angle. In particular, provision is made for the first scan point 15 to have the first spatial coordinate X_A in the X-direction, the second spatial coordinate Y_A in the Y-direction and the third spatial coordinate Z_A in the Z-direction. Further, the second scan point 20 likewise has a further first spatial coordinate X_B in the X-direction, a further second spatial coordinate Y_B in the Y-direction and a further third spatial coordinate Z_B in the Z-direction. Then, the roll angle α can be determined by an arctangent function of the ratio of the difference between the further third spatial coordinate Z_B and the third spatial coordinate Z_A and the difference between the further second spatial coordinate Y_B and the second spatial coordinate Y_A:

$$A(X\_A, Y\_A, Z\_A);$$

$$B(X\_B, Y\_B, Z\_B);$$

$$\alpha = a\tan((Z\_B - Z\_A)/(Y\_B - Y\_A);$$

In particular, provision is made for the optoelectronic sensor 5 to be calibrated or corrected on the basis of the determined roll angle α. In particular, the evaluation unit 10 of the optoelectronic sensor 5 can determine the roll angle α to this end and transmit the latter, appropriately corrected, to the control device 11. In particular, this allows improved evaluation of information of the optoelectronic sensor 5 to be made available for the control device 11, and so safety in road traffic can be increased.

In particular, provision is made for the roll angle α to be determined during a driving operation of the motor vehicle 1.

The invention claimed is:

1. A method for determining a roll angle (α) of an optoelectronic sensor of a motor vehicle, wherein the optoelectronic sensor comprises at least one transmitter device, at least one receiver unit and at least one evaluation unit, said method comprising:
    emitting light beams into surroundings of the motor vehicle by the transmitter device;
    receiving light beams reflected at an object by the receiver unit, wherein the received light beams are represented by the evaluation unit as scan points in a sensor image of the surroundings of the motor vehicle generated by the optoelectronic sensor,
    the roll angle (α) is determined by means of the evaluation unit between at least one scan axis and at least one reference axis, wherein the scan axis is formed by at least one scan point of a ground structure and a reference point of the reference axis of the optoelectronic sensor,
    wherein the at least one scan point has a first spatial coordinate, a second spatial coordinate and a third spatial coordinate, and wherein:
        the roll angle (α) is determined by an arctangent function of a ratio of the third spatial coordinate to the second spatial coordinate, or
        the reference point is based on a second scan point,
        wherein the second scan point has a further first spatial coordinate, a further second spatial coordinate and a further third spatial coordinate, and
        wherein the roll angle (α) is determined by an arctangent function of the ratio of a difference between the further third spatial coordinate and the third spatial coordinate and the difference between the further second spatial coordinate and the second spatial coordinate.

2. The method according to claim 1, wherein the reference axis is determined on the basis of a pitch angle and a yaw angle of the optoelectronic sensor.

3. The method according to claim 1, wherein the scan point and the reference point are determined in such a way that these have at least a predetermined lateral distance from one another.

4. The method according to claim 1, wherein the reference point is based on an installation height of the optoelectronic sensor on the motor vehicle.

5. The method according to claim 1, wherein the reference point is based on a second scan point of a second ground structure.

6. The method according to claim 1, wherein the optoelectronic sensor is calibrated by the evaluation unit on the basis of the roll angle (α).

7. The method according to claim 1, wherein the roll angle (α) is determined during a driving operation of the motor vehicle.

8. The method according to claim 1, wherein at least one scan point of at least one road marking recognized in the sensor image is used to determine the roll angle (α).

9. The method according to claim 1, wherein a respective roll angle (α) is determined for a plurality of scan points and the roll angle (α) of the optoelectronic sensor is determined as a statistical mean of the respective determined roll angles (a) of the scan points.

10. An optoelectronic sensor for a motor vehicle comprising:
- at least one transmitter device for emitting light beams into surroundings of the motor vehicle;
- at least one receiver unit for receiving light beams reflected at an object; and
- an evaluation unit embodied to represent the received light beams as scan points in a sensor image of the surroundings of the motor vehicle,
- wherein the evaluation unit is further embodied to determine a roll angle (α) between at least one scan axis and at least one reference axis, wherein the scan axis is formed by at least one scan point of a ground structure and a reference point of the reference axis of the optoelectronic sensor,
- wherein the at least one scan point has a first spatial coordinate, a second spatial coordinate and a third spatial coordinate, and wherein:
  - the roll angle (α) is determined by an arctangent function of a ratio of the third spatial coordinate to the second spatial coordinate, or
- wherein the reference point is based on a second scan point,
  - the second scan point has a further first spatial coordinate, a further second spatial coordinate and a further third spatial coordinate, and wherein:
  - the roll angle (α) is determined by an arctangent function of the ratio of a difference between the further third spatial coordinate and the third spatial coordinate and the difference between the further second spatial coordinate and the second spatial coordinate.

* * * * *